US008254537B2

(12) United States Patent
Harris et al.

(10) Patent No.: US 8,254,537 B2
(45) Date of Patent: Aug. 28, 2012

(54) METHOD AND APPARATUS FOR UPDATING A PRESENCE ATTRIBUTE

(75) Inventors: John M. Harris, Chicago, IL (US); Sean S. Kelley, Barrington, IL (US)

(73) Assignee: Motorola Mobility LLC, Libertyville, IL (US)

( * ) Notice: Subject to any disclaimer, the term of this patent is extended or adjusted under 35 U.S.C. 154(b) by 0 days.

(21) Appl. No.: 11/624,407

(22) Filed: Jan. 18, 2007

(65) Prior Publication Data

US 2007/0182541 A1 Aug. 9, 2007

Related U.S. Application Data (60) Provisional application No. 60/764,918, filed on Feb. 3, 2006.

(51) Int. Cl.
*H04M 1/64* (2006.01)

(52) U.S. Cl. ............... 379/88.22; 379/118; 379/201.06; 379/201.1; 379/207.12; 709/206; 709/209; 709/228; 455/412.2; 455/466

(58) Field of Classification Search ............... 455/456.1, 455/428, 445, 560, 566, 414.1, 517; 379/88.22; 709/206, 204
See application file for complete search history.

(56) References Cited

U.S. PATENT DOCUMENTS

| 6,771,991 | B1* | 8/2004 | Gupta et al. ............... 455/566 |
| 7,359,938 | B1* | 4/2008 | Davies et al. ............... 709/204 |
| 2003/0041101 | A1 | 2/2003 | Hansche et al. |
| 2004/0037271 | A1* | 2/2004 | Liscano et al. ............... 370/352 |
| 2004/0071150 | A1* | 4/2004 | Honkala et al. ............... 370/401 |
| 2004/0133641 | A1* | 7/2004 | McKinnon et al. ............ 709/204 |
| 2004/0153506 | A1* | 8/2004 | Ito et al. ............... 709/204 |
| 2004/0166879 | A1* | 8/2004 | Meadows et al. ............ 455/456.1 |
| 2004/0193688 | A1* | 9/2004 | McKee et al. ............... 709/206 |
| 2005/0068167 | A1* | 3/2005 | Boyer et al. ............... 340/531 |
| 2005/0164682 | A1* | 7/2005 | Jenkins et al. ............. 455/412.1 |
| 2006/0239186 | A1* | 10/2006 | Wu ............... 370/229 |
| 2007/0121867 | A1* | 5/2007 | Ozugur et al. ............. 379/201.1 |

FOREIGN PATENT DOCUMENTS

| JP | EP 1 691 565 | * 10/2004 |
| KR | 1020010044757 A | 6/2001 |
| KR | 1020060067027 A | 6/2006 |

OTHER PUBLICATIONS

KIPO'S Notice of Preliminary Rejection (English Translation), Jan. 31, 2011.

(Continued)

*Primary Examiner* — Joseph J Nguyen (57) ABSTRACT

A Presence Server receives presence information associated with a Presentity, wherein the presence information comprises one or more presence attributes and the Presentity is associated with a Presence Source and a first Watcher. The Presence Server further receives a request from a second Watcher to view a presence attribute of the one or more presence attributes. The Presence Server may further receive a message from the first Watcher specifying a desire to be notified of who is watching the Presentity, presence attributes being filtered, and/or throttling or deferring of presence attribute updates being implemented by the Presence Server. The Presence Server conveys to the first Watcher watcher notification information that informs of Watchers watching the Presentity, what is being watched, presence attributes being filtered, and/or throttling or deferring of presence attribute updates. The Presentity then determines whether to publish a presence attribute update based on the watcher notification information.

6 Claims, 3 Drawing Sheets

OTHER PUBLICATIONS

Segall B et al.: "Content based routing with Elvin4", Proceedings of AUUG2K, XX, XX: Jun. 1, 2000, pp. 1-11.
Phillips M. "Elvin Presence Protocol, Version 1.0", Jun. 10, 200, pp. 1-11, Retrieved from the Internet: URL: http://web.archive.org/web/20040610061857/http://222.tickertape.org/documents/elvin_presence_spec_1.0html [retrieved on Jun. 30, 201].
Fitzpatrick G et al: "Supporting Public Availability and Accessibility with Elvin: Experiences and Reflections", Computer Supported Cooperative Work (CSCW_, vol. 11, No. 3-4, Sep. 1, 2002, pp. 447-474.
European Patent Office, Supplementary Partial European Search Report, Application No. EP07710262, Sep. 2010, 9 pages.

* cited by examiner

METHOD AND APPARATUS FOR UPDATING A PRESENCE ATTRIBUTE

CROSS-REFERENCE TO RELATED APPLICATION

This application claims priority from provisional application Ser. No. 60/764,918, entitled "METHOD AND APPARATUS FOR UPDATING A PRESENCE ATTRIBUTE," filed Feb. 3, 2006, which is commonly owned and incorporated herein by reference in its entirety.

FIELD OF THE INVENTION

The present invention relates generally to packet data communication systems, and more particularly to provision of a Presence Service in a packet data communication system.

BACKGROUND OF THE INVENTION

The Open Mobile Alliance (OMA) has proposed a Presence Service for implementation in a packet data communication system. In a Presence Service such as the one proposed by OMA, a Presentity is a logical entity (typically representing a human) that has presence information associated with it. A Presence Source provides presence information about a Presentity to a Presence Server, and a Watcher requests presence information about a Presentity (or watcher information about a Watcher) from the Presence Server. A Presence Source implemented in a first communication device operated by a first Presence User may publish presence information to the Presence Server by conveying a Session Initiation Protocol SIP (Session Initiation Protocol) PUBLISH message comprising the presence information to the Presence Server. The presence information includes a current state of one or more Presence Information Elements, for example, a location, an availability, a willingness, a mood, an activity, and so on associated with a Presentity representing the first Presence User. The Presence Server then stores the current state of each Presence Information Element in association with the Presentity. In addition, the Presence Server maintains a profile in association with each Presentity, such as the Presentity representing the first Presence User, which profile may include access rules that determine which set of Watchers are authorized to see presence information associated with the Presentity.

A second Presence User may wish to know a state of one or more Presence Information Elements associated with the first Presence User. In order to be informed of the Presence Information Elements associated with the first Presence User, a second Watcher implemented in a second communication device associated with the second Presence User subscribes to watch the first Presence User by conveying a SIP SUBSCRIBE message to the Presence Server requesting presence information associated with the Presentity (that is, the logical entity representing the first Presence User). The SIP SUBSCRIBE message may request notification concerning all Presence Information Elements associated with the Presentity or may request notification concerning a subset of the Presence Information Elements associated with the Presentity. In the latter case, the second Watcher includes a filter in the SIP SUBSCRIBE message that indicates which Presence Information Elements to include or exclude in notifications, and/or indicates triggers to send a notification, for example when a particular Presence Information Element changes from or to a specified value. If the second Watcher is authorized by the Presence Server, for example, by the access rules associated with the Presentity, the second Watcher is then provided with a current state of each requested presence attribute associated with the Presentity via a SIP NOTIFY message.

A Presence Source and a Watcher are logical entities that can be combined in an implementation. For example, the first communication device operated by the first Presence User may implement a Presence Source to publish presence information associated with the Presentity and implement a first Watcher to subscribe to watcher information, that is, to be notified of the watchers, such as the second Watcher, that have subscribed to the presence information associated with the Presentity.

The Presence Source associated with the Presentity then publishes presence information to the Presence Server every time a state of one or more Presence Information Elements changes, regardless of the Presence Information Elements watched by the second Presence User. When one or more Presence Information Elements associated with the Presentity are changing rapidly, the resulting exchange of messaging can consume significant system capacity in a limited bandwidth communication system, such as a wireless communication system, and can consume excessive communication device power when the first communication device comprises a limited life power supply, such as a battery.

Therefore, a need exists for method and apparatus that reduces the messaging exchanged between the first communication device associated with the first Presence User, and the Presence Server in a provision of a Presence Service.

One of ordinary skill in the art will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention.

DETAILED DESCRIPTION OF THE INVENTION

To address the need for a method and apparatus that reduces the messaging exchanged between a Presentity, and more particularly a communication device associated with the Presentity, and a Presence Server in a provision of a Presence Service, a communication system is provided that includes a Presence Server that receives presence information associated with a Presentity, wherein the presence information comprises one or more presence attributes and the Presentity is associated with a Presence Source and a first Watcher. The Presence Server further receives a request from a second Watcher to view a presence attribute of the one or more presence attributes. The Presence Server may further receive a message from the first Watcher specifying a desire to be notified of who is watching the Presentity, of presence attributes that are being filtered, and/or of any throttling or deferring of presence attribute updates that is being implemented by the Presence Server. The Presence Server then conveys to the first Watcher watcher notification information that informs of other Watchers watching the Presentity, of what is being watched, of any presence attributes being filtered, and/or of any throttling or deferring of presence attribute updates. The Presentity then determines whether to publish a presence attribute update based on the watcher notification information.

Generally, an embodiment of the present invention encompasses a method for updating presence attributes comprising receiving presence information associated with a Presentity, wherein the presence information comprises one or more presence attributes, receiving a request from a second Watcher to view a presence attribute of the one or more presence attributes, and informing a first Watcher of the presence attribute requested to be viewed by the second Watcher, wherein the first Watcher is associated with the Presentity.

Another embodiment of the present invention encompasses a method for updating presence attributes comprising conveying presence information associated with a Presentity to a Presence Server, wherein the presence information comprises one or more presence attributes, receiving watcher notification information identifying one or more of a presence attribute, of the one or more presence attributes, that is being watched by a Watcher and a presence attribute, of the one or more presence attributes, that is being filtered by the Presence Server, updating a presence attribute of the one or more presence attributes to produce an updated presence attribute, and based on the watcher notification information, determining whether to publish the updated presence attribute to the Presence Server.

Yet another embodiment of the present invention encompasses a method for updating presence attributes comprising receiving presence information associated with a Presentity, wherein the presence information comprises one or more presence attributes, and conveying information to a Watcher informing that an update of a presence attribute of the one or more presence attributes is one or more of being deferred and being filtered.

Still another embodiment of the present invention encompasses a method for updating presence attributes comprising conveying presence information associated with a Presentity, wherein the presence information comprises one or more presence attributes, and receiving information informing that an update of a presence attribute of the one or more presence attributes is being deferred.

Yet another embodiment of the present invention encompasses a method for updating presence attributes comprising determining that no one is watching a Presentity and, in response to determining that no one is watching the Presentity, determining one or more of to not publish, to a Presence Server, an update of a presence attribute associated with the Presentity or to publish a reduced set of presence attributes to the Presence Server.

Still another embodiment of the present invention encompasses a method for updating presence attributes comprising conveying presence information associated with a Presentity to a Presence Server, wherein the presence information comprises one or more presence attributes, receiving watcher notification information identifying one or more Watchers watching a presence attribute of the one or more presence attributes, updating a presence attribute of the one or more presence attributes to produce an updated presence attribute, and determining whether to publish the updated presence attribute to the Presence Server based on one or more of a number of Watchers watching the presence attribute and a priority of a Watcher watching the presence attribute.

Yet another embodiment of the present invention encompasses a presence server comprising a processor that is configured to receive presence information associated with a Presentity, wherein the presence information comprises one or more presence attributes, receive a request from a second Watcher to view a presence attribute of the one or more presence attributes, and inform a first Watcher associated with the Presentity of the presence attribute requested to be viewed by the second Watcher.

Still another embodiment of the present invention encompasses a user terminal comprising a processor that is configured to convey presence information associated with a Presentity to a Presence Server, wherein the presence information comprises one or more presence attributes, receive watcher notification information identifying one or more of a presence attribute, of the one or more presence attributes, that is being watched by a Watcher and a presence attribute, of the one or more presence attributes, that is being filtered by the Presence Server, update a presence attribute of the one or more presence attributes to produce an updated presence attribute and, based on the watcher notification information, determine whether to publish the updated presence attribute to the Presence Server.

Yet another embodiment of the present invention encompasses a presence server comprising a processor that is configured to receive presence information associated with a Presentity, wherein the presence information comprises one or more presence attributes, and convey information to a Watcher informing that an update of a presence attribute of the one or more presence attributes is one or more of being deferred and being filtered.

Still another embodiment of the present invention encompasses a user terminal comprising a processor that is configured to convey presence information associated with a Presentity, wherein the presence information comprises one or more presence attributes, and receive information informing that an update of a presence attribute of the one or more presence attributes is being deferred.

Yet another embodiment of the present invention encompasses a user terminal comprising a processor that is configured to determine that no one is watching a Presentity and, in response to determining that no one is watching the Presentity, determine one or more of to not publish, to a Presence Server, an update of a presence attribute associated with the Presentity or to publish a reduced set of presence attributes to the Presence Server.

Still another embodiment of the present invention encompasses a user terminal comprising a processor that is configured to convey presence information associated with a Presentity to a Presence Server, wherein the presence information comprises one or more presence attribute, receive watcher notification information identifying one or more Watchers watching a presence attribute of the one or more presence attributes, update a presence attribute of the one or more presence attributes to produce an updated presence attribute, and determine whether to publish the updated presence attribute to the Presence Server based on one or more of a number of Watchers watching the presence attribute and a priority of a Watcher watching the presence attribute.

Figure 1:
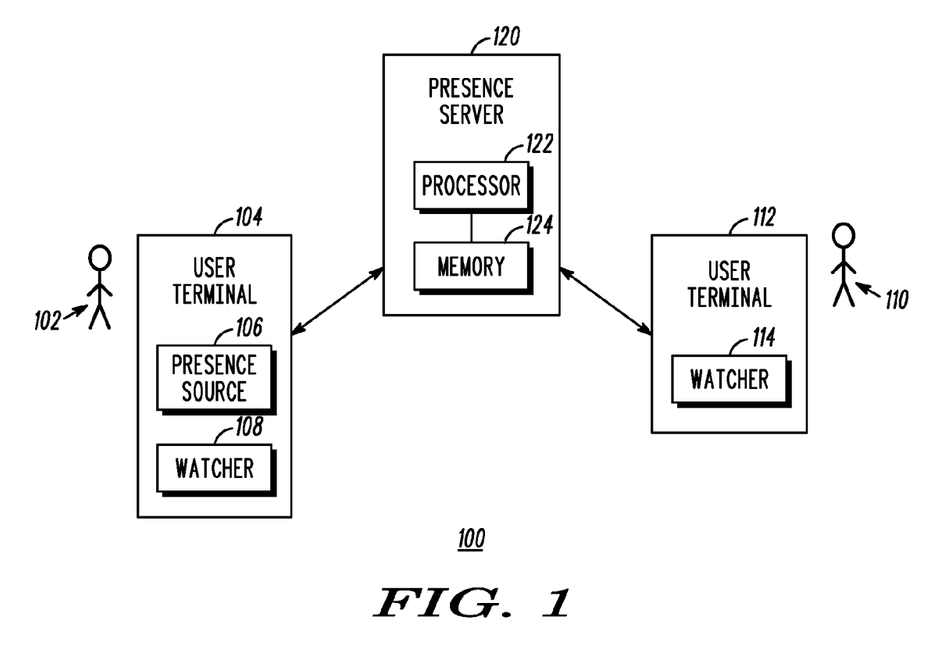
FIG. 1 is a block diagram of a communication system in accordance with an embodiment of the present invention.

The present invention may be more fully described with reference to FIGS. 1-3B. FIG. 1 is a block diagram of a communication system 100 in accordance with an embodiment of the present invention. Communication system 100 includes multiple Presence Users 102, 110 (two shown) that are each associated with a respective user terminal 104, 112, such as but not limited to a wireless mobile device, for example, a cellular telephone, a radio telephone, a personal digital assistant (PDA) with radio frequency (RF) capabilities, or a wireless modem that provides RF access to digital terminal equipment (DTE) such as a laptop computer, or a wireline device, such as but not limited to a wireline telephone, a personal computer (PC), a laptop computer, or other digital terminal equipment (DTE) that may interface to a wireline network. Each Presence User 102, 110 subscribes to a Presence Service offered by communication system 100.

Presence User 102 is associated with a Presentity (that is, a logical entity that has presence information associated with it), and other Presence Users, such as Presence User 110, may watch presence information associated with the Presentity. User terminal 104 implements a Presence Source 106 that publishes presence information associated with the Presentity corresponding to Presence User 102. User terminal 104 further implements a first Watcher 108 that may subscribe to watcher notification information, that is, subscribe to watch, among other information, who is watching the Presentity, what presence attributes are being filtered, for example, being included or excluded in notifications due to a request from the Watcher and/or a policy of the Presentity and/or a local policy of the Presence Server. As is known in the art, a Presence Source is a logical entity that provides presence information associated with a Presentity to a Presence Server, such as Presence Server 120, and a Watcher is a logical entity that requests information, such as presence information, watcher information, or watcher notification information, from the Presence Server. User terminal 112 subscribes to the presence information associated with the Presentity corresponding to Presence User 102 and, therefore, implements a second Watcher 114. However, user terminal 112 may or may not be associated with a Presentity and may or may not implement a Presence Source.

Figure 2:
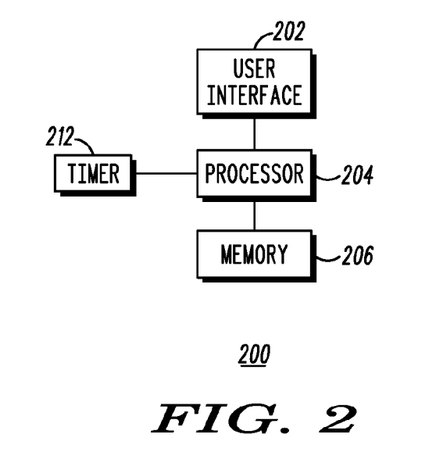
FIG. 2 is a block diagram of a user terminal in accordance with an embodiment of the present invention.

FIG. 2 is a block diagram of an exemplary user terminal 200, such as user terminals 104 and 112, in accordance with various embodiments of the present invention. UE 200 includes a processor 204, such as one or more microprocessors, microcontrollers, digital signal processors (DSPs), combinations thereof or such other devices known to those having ordinary skill in the art. The particular operations/functions of processor 204, and respectively thus of user terminal 200, is determined by an execution of software instructions and routines that are stored in a respective at least one memory device 206 associated with the processor, such as random access memory (RAM), dynamic random access memory (DRAM), and/or read only memory (ROM) or equivalents thereof, that store data and programs that may be executed by the corresponding processor. User terminal 200 further includes a user interface 202 coupled to processor 204 that provides a user of the user terminal with the capability of interacting with the user terminal, including inputting instructions into the user terminal.

When user terminal 200 implements one or more of a Presence Source, such as Presence Source 106, and a Watcher, such as Watchers 108 and 114, the one or more of the Presence Source and Watcher are implemented in an application layer of the processor 204 of the user terminal based on software instructions and routines that are stored in the respective at least one memory device 206 of the user terminal. User terminal 200 may further comprise a timer 212 that counts down a reporting time period. The reporting time period corresponds to a time period during which the user terminal holds off reporting any presence attributes of an associated Presentity that are updated during the time period. As is known in the art, a Presentity is a logical entity that has presence information associated with it. Typically, a Presentity is a person; however, a Presentity may be a role, such as a help desk, or a resource, such as a conference room.

Communication system 100 further includes a Presence Server 120 that may be accessed by each of user terminals 104 and 112. For example, Presence Server 120 may be coupled to a data network, such as an Internet Protocol network, and may be accessed by a wireline device via a wireline connection to the data network or by a wireless mobile device via a wireless access network that is, in turn, connected to the data network. Presence Server 120 includes a processor 122, such as one or more microprocessors, microcontrollers, digital signal processors (DSPs), combinations thereof or such other devices known to those having ordinary skill in the art. The particular operations/functions of processor 122, and thus of the Presence Server, are determined by an execution of software instructions and routines that are maintained in a respective at least one memory device 124 associated with the processor, such as random access memory (RAM), dynamic random access memory (DRAM), and/or read only memory (ROM) or equivalents thereof, that store data and programs that may be executed by the corresponding processor.

The at least one memory device 124 of Presence Server 120 further maintains a profile in association with each Presentity included in communication system 100, such as the Presentity associated with Presence User 102, which profile includes a Presence Policy associated with the Presentity. As is known in the art, a Presence Policy includes a set of policies, such as access rules that determine which watchers are authorized to see presence information associated with the Presentity, and content rules that determine which Presence Information Elements a particular Watcher of the Presentity is authorized to see. The at least one memory device 124 of Presence Server 120 further maintains presence information associated with each Presentity hosted by the Presence Server and published by one or more Presence Sources associated with each Presentity. In addition, the at least one memory device 124 of Presence Server 120 may further maintain filtering information associated with each such Presentity, that is, presence attributes that the Presence Server is, or is not, notifying to each Watcher, and/or information concerning any throttling or deferring of presence-related messaging being employed by the Presence Server. Any filtering maintained and employed by Presence Server 110 may be based on a request of a Presentity (that is, a request by the Presentity that Watchers not be notified of particular presence attributes), a request of a subscribing Watcher (that is, a request by a Watcher to be notified only of particular presence attributes or to not be notified of particular presence attributes), or a policy of an operator of communication system 100.

The embodiments of the present invention preferably are implemented within user terminals 104 and 112 and Presence Server 120. More particularly, the functionality described herein as being performed by Presence Server 120 is implemented with or in software programs and instructions stored in the respective at least one memory device 124 of the Presence Server and executed by an associated processor 122 of the Presence Server, the functionality described herein as being performed by the Presentity associated with Presence User 102 may be performed by user terminal 104 and, the functionality described herein as being performed either of user terminals 104 and 112, for example, by Presence Source 106 or Watcher 108 of user terminal 104 or by Watcher 114 of user terminal 112, is implemented with or in software programs and instructions stored in a respective at least one memory device 206 of a corresponding user terminal and executed by an associated processor 204 of the user terminal. However, one of ordinary skill in the art realizes that the embodiments of the present invention alternatively may be implemented in hardware, for example, integrated circuits (ICs), application specific integrated circuits (ASICs), and the like, such as ASICs implemented in one or more of user terminals 104 and 112 and Presence Server 120. Based on the present disclosure, one skilled in the art will be readily capable of producing and implementing such software and/or hardware without undo experimentation.

Communication system 100 comprises a packet data communication system that operates in accordance with, and implements a Presence Service in accordance with, the Internet Engineering Task Force (IETF) and Open Mobile Alliance (OMA) specifications. More particularly, communication system 100 operates in accordance with the OMA presence specifications such as OMA-RD-Presence_S-IMPLE-V1_0-20051006-C, OMA-AD-Presence_SIMPLE-V1_0-20051006-C, OMA-TS-Presence_SIMPLE-V1_0-20051222-C, and OMA-TS-Presence_SIMPLE_XDM-V1_0-20051222-C, and the IETF specifications referenced therein, including RFC (Request for Comments) 3856, RFC 3857, and RFC 3858, which specifications are hereby incorporated herein in their entirety. As described therein, a Presence Source, such as Presence Source 106, a Watcher, such as Watcher 108, and a Presence Server, such as Presence Server 120, use Session Initiation Protocol (SIP)-type messaging to exchange presence-related information. When one or more of the multiple user terminals 104, 112 is a wireless mobile device, the user terminal may use any one of a variety of air interface technologies to transmit packet data over an associated air interface to Presence Server 120. For example, communication system 100 may comprise one or more of a Code Division Multiple Access (CDMA) communication system, a Global System for Mobile communication (GSM) communication system, a Universal Mobile Telecommunication Service (UMTS) communication system, an Orthogonal Frequency Division Multiple Access (OFDM) communication system, or a Wireless Local Area Network (WLAN) communication system as described by the IEEE (Institute of Electrical and Electronics Engineers) 802.xx standards, for example, the 802.11a, 802.11g, 802.16, or 802.21 standards. As those who are of ordinary skill in the art realize, the type of air interface employed by communication system 100 is not critical to the present invention and communication system 100 may be any packet data communication system without departing from the spirit and scope of the present invention.

Figure 3A:
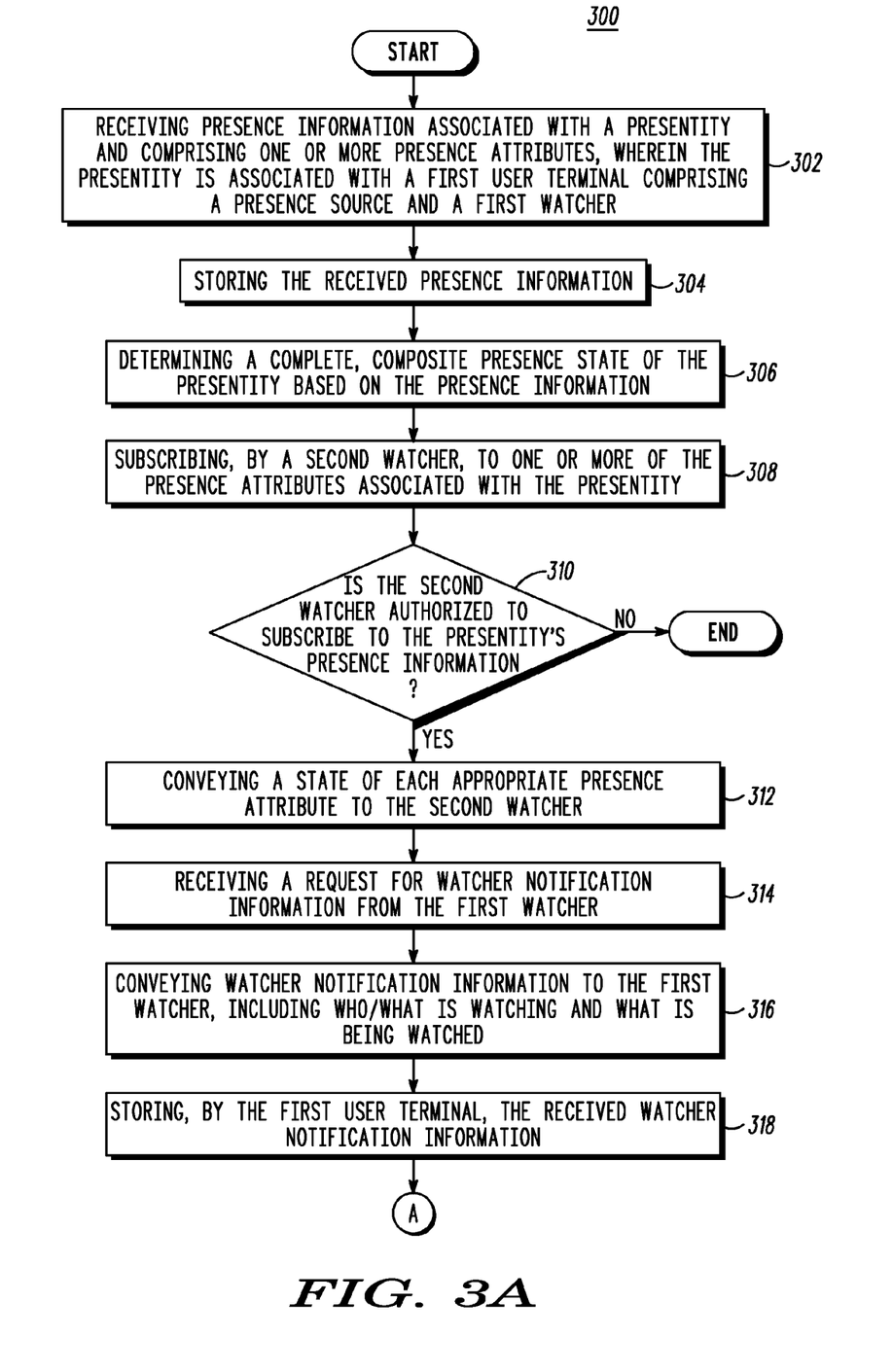
FIG. 3A is a logic flow diagram of a method of updating presence attributes executed by the communication system of FIG. 1 in accordance with an embodiment of the present invention.
Figure 3B:
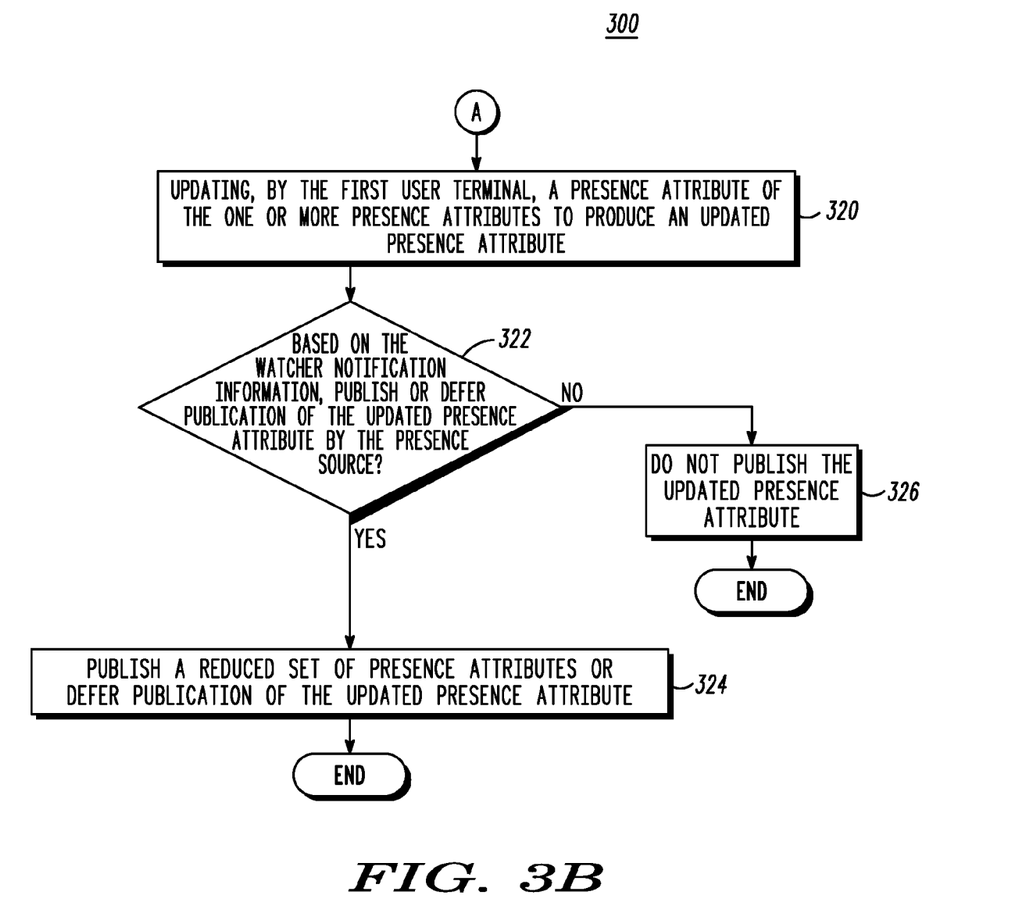
FIG. 3B is a continuation of the logic flow diagram of FIG. 3A depicting a method of updating presence attributes executed by the communication system of FIG. 1 in accordance with an embodiment of the present invention.

Referring now to FIGS. 3A and 3B, a logic flow diagram 300 is provided that depicts a method of updating presence attributes executed by communication system 100 in accordance with various embodiments of the present invention. Logic flow diagram 300 begins when a first Presence User 102, and more particularly Presence Source 106 of a first user terminal 104, conveys, that is, publishes, to Presence Server 120 and the Presence Server receives (302) from the Presence Source presence information associated with the Presentity corresponding to the first Presence User. The presence information comprises one or more presence attributes, or Presence Information Elements, for example, a location, an availability, a willingness, a mood, an activity, and so on associated with the Presentity. As is known in the art, Presence Source 106 may convey such presence information to Presence Server 120 in a SIP PUBLISH message having one or more Presence Information Elements, that is, the location, availability, willingness, mood, activity, and so on associated with the Presentity corresponding to first Presence User 102. Presence Server 120 receives the presence information from Presence Source 106, stores (304) the presence information in at least one memory device 124, and based on the received presence information (and information received from other Presence Sources not shown associated with the Presentity) determines (306) a complete, composite presence state of the Presentity.

Before, during, or after the conveyance of presence information by Presence Source 106 to Presence Server 120, a second Presence User 110, and more particularly a second Watcher 114 of a second user terminal 112 associated with the second Presence User, subscribes (308) to, that is, requests to watch, one or more presence attributes associated with the Presentity corresponding to first Presence User 102. In various embodiments of the present invention, the request may include a filter that specifies which Presence Information Elements to include or exclude in notifications, and/or triggers to send a notification, for example when a particular Presence Information Element changes from or to a specified value. As is known in the art, second Watcher 114 may request such presence information by conveying a SIP SUBSCRIBE (PRESENCE INFORMATION) message to Presence Server 120, which message identifies the Presentity corresponding to first Presence User 102 and may further include a filter identifying the Presence Information Elements that the Watcher desires to watch. For example, Watcher 114 may convey a request for the complete composite state of the Presentity or for a subset of the composite state. In the latter instance, the SIP SUBSCRIBE message would include a filter that defines the Presence Information Elements of interest.

In response to receiving the request from second Watcher 114 to subscribe to the Presentity's presence information, Presence Server 120 determines (310) whether second Watcher 114 is authorized to subscribe to, that is, to view, the Presentity's presence information. Preferably, Presence Server 120 makes this determination by reference to the Presence Policy maintained by the Presence Server in association with the Presentity as is known in the art. For example, second Watcher 114 may be authorized to view all Presence Information Elements associated with the Presentity, to view some but less than all Presence Information Elements associated with the Presentity, or may not be authorized to view any Presence Information Element associated with the Presentity. By way of another example, second Watcher 114 may be 'politely blocked' with respect to one or more Presence Information Elements associated with the Presentity, wherein a predetermined state of the politely blocked Presence Information Element is returned to the second Watcher regardless of the actual state of the Presence Information Element.

In response to determining that second Watcher 114 is authorized to view, that is, subscribe to, the presence information associated with the Presentity associated with first Presence User 102, Presence Server 120 conveys (312) a state of each appropriate Presence Information Element to second Watcher 114. Typically, a Presence Server, such as Presence Server 120, conveys the states of the appropriate Presence Information Elements by conveying a SIP NOTIFY message to each such Watcher comprising a state of each appropriate Presence Information Element. For example, if second Watcher 114 is authorized to view all Presence Information Elements associated with the Presentity, then Presence Server 120 may return a current state of all Presence Information Elements requested by the second Watcher. By way of another example, if second Watcher 114 is authorized, for example, based on content rules associated with the Presentity, to view some but less than all Presence Information Elements associated with the Presentity, then Presence Server 120 may return a current state only of the requested and authorized Presence Information Elements. By way of yet another example, if second Watcher 114 is politely blocked with respect to one or more Presence Information Elements, then, for each requested and politely blocked Presence Information Element, Presence Server 120 may return only the predetermined state of the Presence Information Element.

Before, during, or after the requesting by second Watcher 114 to watch the Presentity associated with first Presence User 102, the first Presence User 102, and more particularly a first Watcher 108 of first user terminal 104, conveys to Presence Server 120 and the Presence Server receives (314) from the first Watcher a request to subscribe to watcher notification information associated with the Presentity, that is, a request to watch who is watching the Presentity, what presence attributes are being filtered, for example, being included or excluded in notifications due to a request from the Watcher and/or a policy of the Presentity and/or a local policy of the Presence Server, and/or any throttling or deferring of presence attribute updates being implemented by Presence Server 120. In one embodiment, first Watcher 108 may convey a SIP SUBSCRIBE (WATCHER INFORMATION) message to the Presence Server 120 as is known in the art. However, in another embodiment of the present invention, first Watcher 108 may convey a modified version of such a SIP SUBSCRIBE message, that is, a SIP SUBSCRIBE (WATCHER NOTIFICATION INFORMATION) message, which message is modified to permit the first Watcher to specify the information that the first Watcher wishes to be informed of, for example, to specify a desire to be notified of who is watching the Presentity, what presence attributes are being filtered, for example, are being included or excluded in notifications due to a request from the Watcher and/or a policy of the Presentity and/or a local policy of the Presence Server, and/or any throttling or deferring of presence attribute updates, that is, any throttling or deferring of conveyances to watching Watchers of presence attribute updates, being implemented by Presence Server 120.

In response to receiving the request from first Watcher 108 after another Watcher, such as second Watcher 114, has already subscribed to watch the Presentity associated with first Presence User 102, or in response to receiving a request from Watcher 114 to watch the Presentity after first Watcher 108 has requested to be notified of who is watching the Presentity, Presence Server 120 conveys (316) a watcher notification information message to first Watcher 108. The watcher notification information message comprises watcher notification information associated with Watchers, such as second Watcher 114, watching the Presentity, such as a list of Watchers watching the Presentity, information identifying what is being watched, for example, the presence attributes watched by each of the listed Watchers, any presence attributes being 'politely blocked' with respect to any of the listed Watchers, and any presence attributes being filtered by Presence Server 120 due to a policy of the presentity or a local policy of the Presence Server (that is, presence attributes that Presence Server is not supporting, that is, is not notifying to the watching Watchers), and/or any throttling or deferring of presence attribute updates, that is, any throttling or deferring of conveyances to watching Watchers of presence attribute updates, being implemented by Presence Server 120. In one embodiment of the present invention, the watcher notification information message may comprise a modified version of a SIP NOTIFY (PRESENCE INFORMATION) message, which message is extended to include information concerning what is being watched and/or any throttling or deferring of presence attribute updates. In response to receiving the watcher notification information message, first Presence User 102, and more particularly user terminal 104, stores (318) the received information, preferably in an at least one memory device 206 of the user terminal.

When the Presentity associated with first Presence User 102, and more particularly, when first user terminal 104 subsequently updates (320) one of its own presence attributes to produce an updated presence attribute, the Presentity, and in particular the first user terminal, determines (322) whether to publish and/or defer a publication of the updated presence attribute based on the watcher notification information received by the first Watcher 108 from Presence Server 120. In response to determining to publish and/or defer a publication of the updated presence attribute, first user terminal 104, that is, Presence Source 106, then publishes (324), that is, conveys to Presence Server 120, the updated presence attribute or defers a publication of the updated presence attribute, whichever is appropriate. In response to determining not to publish the updated presence attribute, first user terminal 104 does not publish (326), that is, does not convey, the updated presence attribute to Presence Server 120. Logic flow 300 then ends.

In one embodiment of the invention, at step 322, first user terminal 104 may determine to publish updates of presence attributes associated with the Presentity associated with first Presence User 102 based on a determination that the publication of the updated presence attribute will trigger a notification of a new state of the presence attribute to one or more watching Watchers, such as second Watcher 114. For example, suppose second Watcher 114 is watching, and is entitled (for example, based on a policy of the Presentity or a filter requested by Watcher 114) to updates only of an availability and a location of the Presentity. Subsequent to second Watcher 114 subscribing to see the availability and a location of the Presentity, when the Presentity updates its availability or location at step 320, then first user terminal 104 determines to publish, and Presence Source 106 publishes, the updated presence attribute to Presence Server 120. However, when the Presentity updates a presence attribute that is not being watched by other Presentities, such as mood, then first user terminal 104 may determine not publish the unwatched presence attribute (since publication of the attribute will not trigger a notification of a state of the presence attribute to one or more watching Watchers).

By way of another example, the at least one memory device 126 of Presence Server 120 may store information with respect to second Watcher 114 indicating that the Watcher wishes to be notified of a presence attribute update only when the presence attribute changes to a particular value, such as the Presentity changing to a particular location. The watcher notification information conveyed to first Watcher 108 at step 316 may include this information, that is, a value of the presence attribute that would trigger a notification of an update of the presence attribute to second Watcher 114. As a result, at step 322, the Presentity, and in particular user terminal 104, may determine whether to publish a notification based on a value of the presence attribute. That is, when the Presentity, that is, user terminal 104, updates the presence attribute to a value that would trigger a notification of an update of the presence attribute to second Watcher 114, then user terminal 104 determines to publish the updated presence attribute to Presence Server 120. However, when the Presentity, that is, user terminal 104, updates the presence attribute to a value other than the value would trigger a notification of an update of the presence attribute to second Watcher 114, then user terminal 104 determines to not publish the updated presence attribute to Presence Server 120.

By way of yet another example, suppose that second Watcher 114 is watching the Presentity associated with first Presence User 102 and is being 'politely blocked' with respect to one or more Presence Information Elements associated with the Presentity, for example, a location of the Presentity. When the Presentity updates its location at step 320, the Presentity, and in particular first user terminal 104, may determine, at step 322, that a publication of the updated presence attribute to Presence Server 120 may not trigger a notification of the updated presence attribute or may trigger a notification of a same predetermined and already notified state of the presence attribute to watching Watcher 114. Accordingly, at step 322, first user terminal 104 may determine not to publish the updated presence attribute to Presence Server 120. However, when the Presentity updates, at step 320, a non-politely blocked presence attribute that is being watched by second Watcher 114, then the Presentity, that is, first user terminal 104, may determine to publish, and then Presence Source 106 may publish, the new state of the updated presence attribute to Presence Server 120.

By way of still another example, suppose that first Watcher 108 is informed, at step 316, that Presence Server 120 is excluding notification of particular presence attributes, such as location. This may be due to a local policy of the Presence Server to limit presence related loading of communication system 100, for example, by excluding notification of attributes that change frequently during a heavily loaded period of the communication system. As a result, when the Presentity associated with first Presence User 102, and more particularly first user terminal 104, updates a presence attribute at step 320 that is being excluded by the Presence Server 120, the Presentity, and in particular first user terminal 104, may determine, at step 322, to not publish the updated presence attribute, or to published a reduced set of presence attributes that does not include the updated presence attribute, since a publication of the updated (and excluded) presence attribute by Presence Source 106 will not trigger a notification of a state of the presence attribute to one or more watching Watchers, such as second Watcher 114.

By way of yet another example, when Presence Server 120 conveys to first Watcher 108 the list of other Watchers watching the Presentity associated with Presence User 102, the list may indicate that one or more other Watchers are no longer watching the Presentity. For example, a Watcher included in a preceding list sent to first Watcher 108 may not be included in the most recent list. In such an event, the Presentity, and in particular first user terminal 104, may determine, at step 322, to not publish presence attributes that were being watched only by the no longer watching Watcher. In other words, when first user terminal 104 determines that no Watcher is watching a particular presence attribute, the first user terminal may determine to not publish, or to cease publication of, that presence attribute since publication of the attribute will not trigger a notification of a state of the attribute to a still watching Watcher. When first user terminal 104 determines that no Watcher is watching the Presentity associated with Presence User 102, then, at step 322, first user terminal 104 may determine to publish a reduced set of presence attributes, that is, a subset of the complete set of presence attributes, to Presence Server 120 or to not publish at all.

By way of still another example, user terminal 104 may further maintain, in the at least one memory device 206 of the user terminal, a Watcher threshold, that is, a minimum number of Watchers watching a presence attribute for the user terminal to publish an update of the presence attribute. User terminal 104 may then determine, at step 322, whether to publish an update of a presence attribute based on the number of Watchers watching the presence attribute, preferably based on a comparison of the number of Watchers to the Watcher threshold. For example, based on the watcher notification information received by Watcher 108, indicates that fewer Watchers than the Watcher threshold are watching a presence attribute, user terminal 104 may determine, at step 322, to not publish an update of the presence attribute to Presence Server 120. On the other hand, when the watcher notification information received by Watcher 108 indicates that a number of Watchers equal to or greater than the Watcher threshold are watching a presence attribute, user terminal 104 may determine, at step 322, to publish an update of the presence attribute to Presence Server 120.

By way of yet another example, user terminal 104 may further maintain, in the at least one memory device 206 of the user terminal, a predetermined priority in association with each of the other Watchers, or user terminals and my further maintain a priority threshold. User terminal 104 may determine, at step 322, whether to publish an update of a presence attribute based on the priorities of the Watchers watching the presence attribute, preferably based on a comparison of the priority of each such Watcher to the priority threshold. For example, when the watcher notification information received by Watcher 108 indicates that only a low priority Watcher(s), such as Watchers below the priority threshold, is watching a presence attribute, user terminal 104 may determine, at step 322, to not publish an update of the presence attribute to Presence Server 120. On the other hand, when the watcher notification information received by Watcher 108 indicates that a high priority Watcher(s) is watching a presence attribute, such as a Watcher above the priority threshold, user terminal 104 may determine, at step 322, to publish an update of the presence attribute to Presence Server 120.

In another embodiment of the present invention, the Presentity associated with Presence User 102, and more particularly first user terminal 104, may determine, at step 322, to defer a publication of an updated presence attribute based on the information received from Presence Server 120. For example, when communication system 100 is heavily loaded, Presence Server 120 may defer, or throttle, a conveying of notifications to watching Watchers, such as second Watcher 114, of updates of presence attributes associated with the Presentity, waiting until expiration of a deferral time period before conveying presence attribute update notifications to the watching Watchers. For example, Presence Server 120 may defer conveying any updated presence attributes received during the deferral period until near the expiration of the deferral time period, may convey, near expiration of the deferral time period, only the most recently received update of each presence attribute and drop all other presence attribute updates received during the deferral time period, or may drop all presence attribute updates received during the deferral time period and only convey presence attribute updates received after expiration of the deferral time period.

In the event that Presence Server 120 is deferring, or throttling, a conveying of notifications to watching Watchers of updates of presence attributes associated with the Presentity associated with Presence User 102, the Presentity, and more particularly first user terminal 104, may determine to defer publication of presence attributes to Presence Server 120 until expiration of a reporting time period, which reporting time period is determined by reference to a timer 212 of the user terminal 104 and which time period expires shortly before the expiration of the deferral time period. For example, publication of a presence attribute to Presence Server 120 early in a deferral time period may be wasteful in that the presence attribute may change several times during the deferral time period. Furthermore, publication of multiple updates of a presence attribute to Presence Server 120 during a deferral time period may be wasteful in that only the last of the multiple updates may be relevant when the Presence Server 120 notifies the Watchers watching the Presentity of updated presence attributes.

Therefore, when the Presentity, and more particularly first user terminal 104, determines, at step 322, that a publication of the updated presence attribute to Presence Server 120 may trigger a delayed or deferred conveyance, by the Presence Server, of a notification of a new state for the updated presence attribute to watching Watchers, such as Watcher 114, or that the updated presence attribute will be dropped by the Presence Server, then the Presentity, that is, first user terminal 104, may further determine to defer publication of, or to not publish, to Presence Server 120 updates of presence attributes that occur during the deferral time period. For example, if first user terminal 104 determines to defer publication of the updated presence attribute to Presence Server 120, then the first user terminal may, by reference to timer 212 of the user terminal, wait until expiration of a reporting period before publishing the updated presence attribute to Presence Server 120. In the meanwhile, the Presentity, that is, first user terminal 104 and preferably Presence Source 106, may aggregate all presence attributes updated since the expiration of a preceding reporting period and convey all updated presence attributes at the end of the reporting period. Preferably, the reporting period is determined such that the period expires shortly before the Presence Server 120 is scheduled to send a next notification to the Watchers, such as second Watcher 114, watching the Presentity.

In yet another embodiment of the present invention, if other Watchers are watching the Presentity associated with Presence User 102 when second Watcher 114 subscribes, at step 308, to watch the Presentity, and when first Watcher 108 (associated with the Presentity) has already requested watcher notification information concerning all watching Watchers prior to second Watcher 114 subscribing to watch the Presentity, step 316 may further comprise Presence Server 120 determining, based on the presence attributes that second Watcher 114 requests and is authorized to watch, whether to convey a watcher notification information message to first Watcher 108 in response to the subscribing by second Watcher 114. When second Watcher 114 requests and is authorized to watch presence attributes that are already subscribed to by the other watching Watchers, Presence Server 120 may determine to not convey a watcher notification information message to first Watcher 108. That is, since first Watcher 108 is already publishing updates of the presence attributes requested by second Watcher 114, Presence Server 120 need not again request the Presentity, that is, user terminal 104 and in particular Presence Source 106, to publish these attributes. However, when second Watcher 114 requests and is authorized to watch one or more presence attributes that have not been subscribed to by the other watching Watchers, Presence Server 120 may determine to convey a watcher notification information message to first Watcher 108.

In still another embodiment of the present invention, if second Watcher 114 withdraws from watching the Presentity associated with Presence User 102 when the Presentity is still being watched by Watchers other than second Watcher 114, and if the presence attributes that were being watched by second Watcher 114 are also subscribed to by the other Watchers, then Presence Server 120 may determine to not convey a watcher notification information message to first Watcher 108. Since Presence Source 106 has to continue to publish, to Presence Server 120, updates of the presence attributes that had been requested by, and authorized for, second Watcher 114, informing the first Watcher 108, and thereby first user terminal 104, of the withdrawal of the second Watcher from watching the Presentity may be considered a surplus message as it may not reduce the messaging between the first user terminal and Presence Server 120.

By Presence Server 120 providing first Watcher 108 with watcher notification information that informs the first Watcher of other Watchers watching the Presentity associated with the first Watcher, of what is being watched, of presence attributes associated with the Presentity that being filtered by the Presence Server, and/or of throttling or deferring of presence attribute updates that is being implemented by the Presence Server, the Presentity, and more particularly user terminal 104 associated with the Presentity, is able to determine whether to publish a presence attribute update based on the watcher notification information. First Watcher 108 may specifically request such information, or the first Watcher may receive such information in response to conveyance to Presence Server 120 of a more generic message of the prior art, such as a SIP SUBSCRIBE message of the prior art.

In determining whether to publish a presence attribute update, the Presentity, and more particularly user terminal 104, may consider, based on the watcher notification information, whether a publication of the updated presence attribute will trigger a notification of a new state of the presence attribute to one or more watching Watchers, such as second Watcher 114. For example, Presence Source 106 may publish the updated presence attribute if the publication will trigger a notification of a new state of the presence attribute to one or more watching Watchers, to a minimum threshold of watching Watchers, and/or to one or more Watchers of a predetermined priority, and not publish the updated presence attribute if the publication will not trigger a notification of a new state of the presence attribute to one or more watching Watchers, to the minimum number of Watchers, or to a Watcher of a high enough priority. By way of another example, the Presentity, and more particularly user terminal 104, may defer a publication of an updated presence attribute, or not publish the updated presence attribute, in response to being informed of throttling or deferring of presence attribute updates that is being implemented by Presence Server 120. In addition, in another embodiment of the present invention, Presence Server 120 may determine to not convey a watcher notification information message to first Watcher 108 when a Watcher is added to, or withdraws from, the list of Watchers watching the Presentity based on the presence attributes being watched by the added or withdrawing Watcher. As a result, the messaging exchanged between user terminal 104 and Presence Server 120 in a provision of a Presence Service by communication system 100 is reduced over the messaging exchanged in the prior art, thereby conserving system capacity and preserving power of a limited life power source, such as a battery, when user terminal 104 is a wireless communication device.

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. The terms "including" and/or "having," as used herein, are defined as comprising. Furthermore, unless otherwise indicated herein, the use of relational terms, if any, such as first and second, top and bottom, and the like are used solely to distinguish one entity or action from another entity or action without necessarily requiring or implying any actual such relationship or order between such entities or actions. An element preceded by " . . . a" does not, without more constraints, preclude the existence of additional identical elements in the process, method, article, or apparatus. For example, a request to view a presence attribute does not preclude the request from comprising a request to view multiple presence attributes.

What is claimed is:

1. A method performed by a Presence Server for updating presence attributes comprising:
   receiving presence information from a Presence Source, wherein the presence information comprises a plurality of presence attributes;
   receiving a request from a second Watcher to view a state of a specific presence attribute of the plurality of presence attributes; and
   informing a first Watcher of the presence attribute whose state is specifically requested to be viewed by the second Watcher, wherein the first Watcher is associated with the Presence Source;
   updating, by the Presence Source, the presence attribute whose state is specifically requested;
   determining, by the Presence Source, whether to publish the updated presence attribute to the Presence Server; and
   deferring, by the Presence Source to the Presence Server, publication of the updated presence attribute based on the determination.

2. The method of claim 1, further comprising informing the first Watcher of a presence attribute that is being filtered.

3. The method of claim 2, wherein receiving comprises receiving a request from the second Watcher to filter a presence attribute of the plurality of presence attributes.

4. The method of claim 1, further comprising filtering the plurality of presence attributes based on an operator policy.

5. The method of claim 1, further comprising not informing the first Watcher of the presence attribute requested to be viewed if the first Watcher has already been informed that the presence attribute is being watched.

6. The method of claim 1, further comprising publishing, by the Presence Source to the Presence Server, the updated presence attribute based on the determination.

* * * * *